No. 701,419. Patented June 3, 1902.
J. M. TALBERT.
CULTIVATOR.
(Application filed June 22, 1901.)
(No Model.)
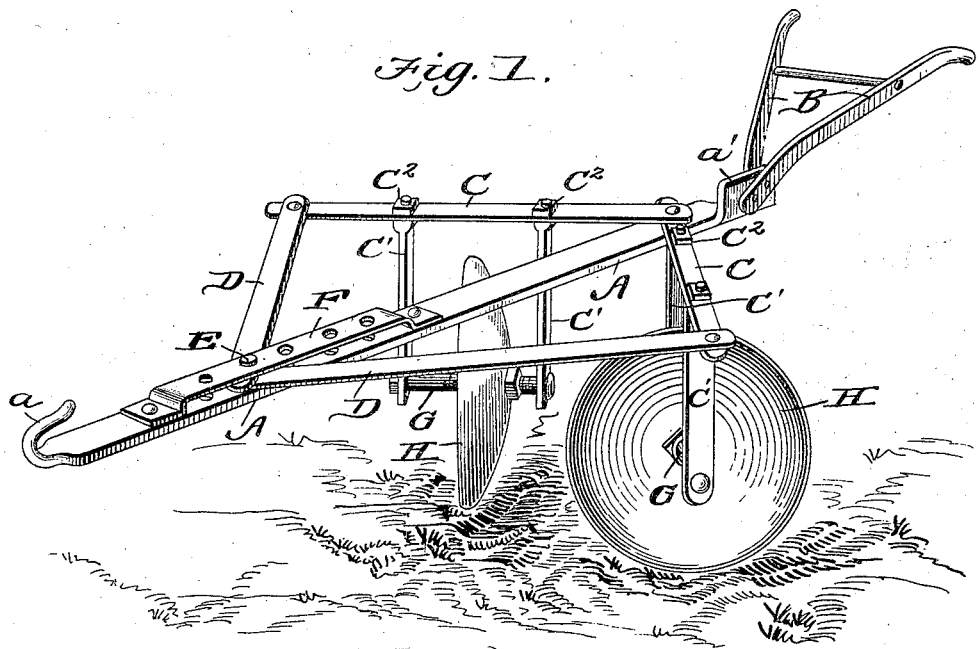
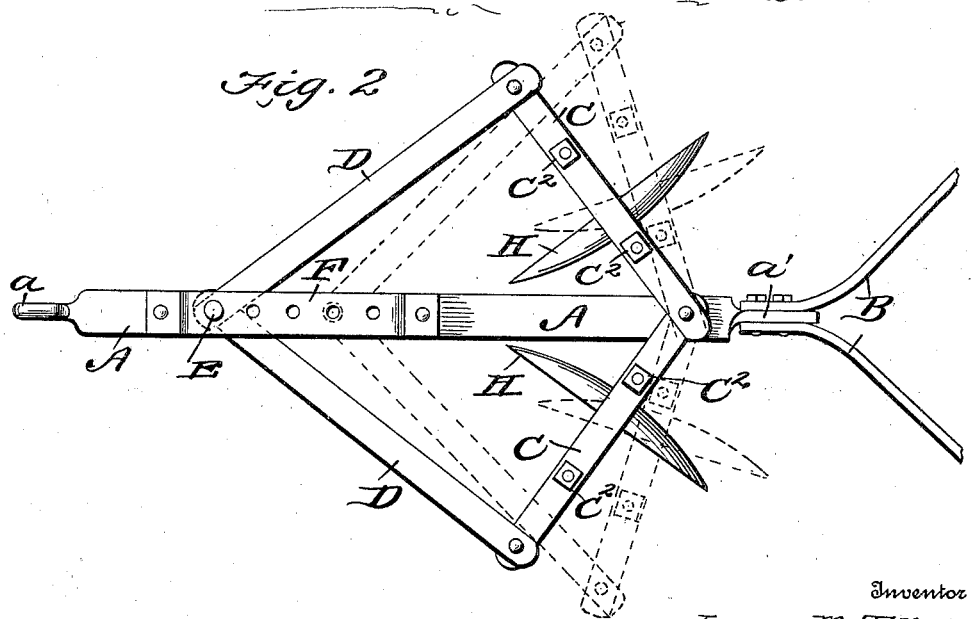
Inventor
Jacob M. Talbert.
Witnesses
By
Attorneys
THE NORRIS PETERS CO., PHOTO-LITHO., WASHINGTON, D. C.

UNITED STATES PATENT OFFICE.

JACOB MICAGAR TALBERT, OF ROME, GEORGIA, ASSIGNOR OF ONE-HALF TO JOHN M. VANDIVER, OF ROME, GEORGIA.

CULTIVATOR.

SPECIFICATION forming part of Letters Patent No. 701,419, dated June 3, 1902.

Application filed June 22, 1901. Serial No. 65,675. (No model.)

*To all whom it may concern:*

Be it known that I, JACOB MICAGAR TALBERT, a citizen of the United States, residing at Rome, in the county of Floyd and State of Georgia, have invented a new and useful Cultivator, of which the following is a specification.

My invention is an improvement in cultivators, and has for its object to provide a simple, cheap, and ecomical construction of framing that shall be capable of easy adjustment whereby the disks may be turned to a greater or less angle as the condition of the soil may require.

With the above object in view my invention will be particularly described in the following specification, and pointed out in the claim, reference being had to the accompanying drawings, in which—

Figure 1 is a perspective view of my improvement; and Fig. 2 is a plan of the same, showing in dotted lines the position of the disks when the arms are adjusted.

In carrying out my invention I usually employ flat iron beams to construct the frame, which consists of a central draft-beam A, having its front end provided with a draft-hook $a$ and its rear end twisted for a short distance to form a vertical section $a'$, to which the handles B are connected. Pivoted near the rear end of the beam are the disk-supporting arms or bars C, whose forward ends are connected to the brace-beams D, having their opposite ends adjustably held to the forward end of the draft-beam. In practice I prefer to provide the beam with perforations that receive a bolt E, which also passes through the perforated ends of the brace-beams, and in order to prevent displacement I secure to the beam a supplemental section F, having a series of perforations that are designed to register with the perforations of the draft-beam, and between the section F and the beam the braces are held, as clearly shown.

The arms or bars C have downwardly-projecting members C', spaced at any suitable distance and secured to the bars by having their upper ends provided with reduced threaded portions that are adapted to pass through apertures in the arms C and held thereto by nuts $C^2$. It will thus be seen that by the construction described the members C' may be easily and quickly replaced should they become bent or broken.

The lower ends of the member C' are apertured and receive axles G, upon which are mounted the cultivator-disks H. These axles are threaded for a portion of their lengths and adapted to receive nuts, between which the disks are held as in the ordinary manner.

By reference to the drawings and the foregoing description it will be readily seen that I provide a very simple and easily-operated cultivator that may be easily and quickly adjusted and the several parts replaced should they become broken.

Having thus fully described my invention, what I claim as new, and desire to secure by Letters Patent, is—

In a cultivator of the kind described the combination of a central draft-beam having a hook arranged upon its forward end, and handle-sections on the rear end thereof, cultivator-supporting arms pivotally connected at one end to the beam, brace-beams pivotally held to the free ends of said arms and having their opposite ends adjustably held to the central beam, downwardly-depending members held to the supporting-arms, each pair having their lower ends connected by a threaded bolt or shaft upon each of which is mounted a cultivator-disk, substantially as shown and described.

JACOB MICAGAR TALBERT.

Witnesses:
W. H. ENNIS,
R. E. HARRIS.